Patented July 7, 1953

2,644,842

UNITED STATES PATENT OFFICE 2,644,842

CATALYTIC HYDROGENATION OF NITRILES

Glenn F. Hager, New Castle, Del., assignor to E. I. du Pont de Nemours and Company, Wilmington, Del., a corporation of Delaware No Drawing. Application June 14, 1950, Serial No. 168,153

10 Claims. (Cl. 260—583)

This invention relates to the preparation of alkylamino compounds.

Amines are of great utility in chemical industry today and alternative processes for their preparation are therefore desirable.

This invention has as an object a new process for the preparation of alkylamino compounds. Other objects will appear hereinafter.

These objects are accomplished by the present invention wherein an aliphatic nitrile is reacted with carbon monoxide and hydrogen in the presence of a catalyst essentially comprising a carbonyl of a group VIII metal of atomic number 27 through 44.

In practicing this invention as a batch operation, a pressure reactor is charged with the aliphatic nitrile and catalyst. The reactor is deoxygenated by evacuation, while the contents are cooled to 0° C. or by sweeping with purified nitrogen. The reactor is then pressured to a pressure of at least 200 atmospheres but preferably 700–1500 atmospheres with a carbon monoxide/hydrogen mixture having a mole ratio of carbon monoxide to hydrogen from 1:10 to 3:1. The reaction mixture is then heated at a temperature of 100° to 250° C. for from five to twenty hours, during which time the pressure within the reactor is maintained at the desired level by repressuring with carbon monoxide/hydrogen gas mixture which may, if desired, contain these gases in a ratio different from that originally used, but within the above ratio range. Thereafter, the reaction mixture is permitted to cool, the reactor is opened, and the contents discharged. The alkylamino compounds are isolated from the product by distillation or other means known to those skilled in the art.

The following examples are illustrative of the invention.

Example I

Ten grams of acetonitrile, 90 g. of methanol and one g. of cobalt carbonyl were placed in a silver-lined pressure vessel of 400 cc. capacity. The air was swept from the reactor with purified nitrogen and a mixture of carbon monoxide and hydrogen in the ratio of 1/2 was introduced to a pressure of 450 atmospheres. The tube was then heated to 250° C. and the pressure maintained at 850–900 atmospheres by periodic repressuring with the same gas mixture. After cooling, the gases were vented leaving a liquid weighing 114 g. This was distilled rapidly from a xylene vapor bath to remove high boiling materials. The distillate was acidified to a pH of 2 with hydrochloric acid and steam distilled. The residue from the steam distillation was made alkaline (pH 11) with sodium hydroxide solution, again steam distilled, and the distillate collected in a flask containing hydrochloric acid. The distillate was cooled in an ice bath and made basic with sodium hydroxide and extracted several times with diethyl ether. The extract, after drying over anhydrous potassium carbonate, was distilled through a packed column having an efficiency equivalent to 26 theoretical plates. After removal of ether, a product boiling from 62.5–95° C. at atmospheric pressure was obtained (product A). From the residue, an additional quantity of material boiling from 115–142° C. (product B) at atmospheric pressure was obtained by distillation through a small distilling flask. These products showed, by the method of J. Am. Chem. Soc. 69, 2609–11, the following analyses:

| Product | Percent Nitrogen | | |
|---|---|---|---|
| | Primary Amine | Secondary Amine | Tertiary Amine |
| A | 0 | 0 | 12.55 |
| B | 0 | 1.1 | 9.8 |

Example II

Ten grams of α-methylbutyronitrile, 90 g. of methanol and one g. of cobalt carbonyl were treated as in Example I. Amines boiling from 110 to 180° C. were isolated by steam distillation and ether extraction.

Example III

Ten grams of acrylonitrile, 90 g. of methanol and one g. of cobalt carbonyl were treated as in Example I. Amines boiling from 160 to 310° C. were obtained. These showed a neutralization equivalent of 221.0 and 220.1, indicating an average composition corresponding to 14.8 carbon atoms per amino group.

Example IV

A pressure reactor was charged with ten ml. of purified liquid formonitrile, 90 ml. of distilled water, and three grams of ruthenium dioxide catalyst. The charged reactor was pressured with a 2:1 hydrogen/carbon monoxide gas mixture so that at 200° C. the total pressure within the reactor was between 690 and 1000 atmospheres. During a 14.5 hour reaction period, during which time the pressure was maintained at the indicated range by periodically repressuring with the hydrogen/carbon monoxide gas mixture there was an observed pressure drop of 1535 atmospheres. A composite of six similar runs was acidified with 85% phosphoric acid and the acidified material subjected to steam distillation. The residue in the still was rendered alkaline and subjected to steam distillation. The product which distilled was partially miscible with water, had a strong amine odor, and was soluble in dilute acid. The residue in the still was a wax-like material which was partially soluble in dilute acid.

*Example V*

A pressure reactor was charged with 3.0 grams ruthenium dioxide, 2.0 grams sodium dodecylsulfate, 100 grams water, and 10.0 grams sodium cyanide and pressured with a 2:1 hydrogen/carbon monoxide mixture to 800–900 atmospheres and heated to 200° C. The temperature was raised to 250° C. when vigorous reaction (pressure drop and temperature rise to 265° C.) occurred. Lowering the temperature to 200° C. did not terminate the reaction. The product, after 4935 atmospheres' pressure drop, had two phases—oil and water of 35 cc. and 190 cc. respectively. Combined with 56 cc. oil from a similar run, the oil on steam distillation, with extraction of the aqueous distillate with n-pentane, gave a product which on fractional distillation gave the following fractions:

|  | G. | $n_D^{25}$ |
|---|---|---|
| (1) below 40° C. at 50 mm | | |
| (2) 40° C. at 50 mm. to 85° C. at 50 mm | 6.54 | 1.4104 |
| (3) 85° C. at 50 mm. to 100° C. at 25 mm | 3.34 | 1.4210 |
| (4) 100° C. at 25 mm. to 108° C. at 25 mm | 2.05 | 1.4250 |
| (5) 76° C. at 2.7 mm. to 92° C. at 2.7 mm | 3.47 | 1.4287 |
| (6) 92° C. at 2.7 mm. to 130° C. at 2.7 mm | 3.33 | 1.4337 |
| residue | 1.32 | |

Cuts (2) through (6) all had an amine odor, gave a basic reaction to litmus when shaken with distilled water, were partially soluble in 10% hydrochloric acid with disappearance of the amine odor and analyzed as follows:

| Cut | Carbon | Hydrogen | Nitrogen |
|---|---|---|---|
| 2 | 79.8, 80.1 | 15.2, 15.3 | 4.6, 4.8 |
| 3 | 78.5, 77.9, 78.5 | 14.6, 14.6, 14.7 | 6.0, 5.8 |
| 4 | 78.7, 78.7 | 14.7, 14.9 | 5.9, 5.9 |
| 5 | 78.6, 78.9 | 14.6, 14.7 | 5.8, 5.7 |
| 6 | 79.3, 79.0 | 14.3, 14.6 | 4.8, 5.1 |

The examples have illustrated certain conditions of temperature, pressure, catalyst concentration, carbon monoxide/hydrogen mixed gas composition, etc. It is to be understood that these are interdependent variables and that variation in one requires compensating adjustments in the others.

Thus, the examples have also illustrated batch operation. It is to be understood, however, that the process may be carried out either as a continuous or semi-continuous operation.

Whether for batch or semi-continuous or continuous operation the desired mixtures of hydrogen and carbon monoxide are made up on the basis of pressures, calculated by the method of successive approximations using the following equation:

$$P(\text{initial CO}) = \frac{(C \text{ initial CO})(P \text{ final})}{(C \text{ final CO}) + N (C \text{ final } H_2)}$$

where P stands for pressure, C stands for the compressibility of the carbon monoxide and of the hydrogen at the indicated pressure, and N is the desired hydrogen/carbon monoxide mole ratio in the mixture.

The mole ratio of carbon monoxide to hydrogen in the gas mixture may vary from 1:10 to 3:1. If the process is being operated for the production of N-methyl substituted aliphatic amines, it is preferred to employ carbon monoxide/hydrogen gas mixtures containing a carbon monoxide to hydrogen mole ratio of from 1:5 to 1:10. The formation of longer chain alkyl substituents is favored by increasing the proportion of carbon monoxide.

The temperature at which the reductive alkylations of this invention can be effected can vary from 100° to 275° C. Since good reaction rates with good yields of desired N-alkyl aliphatic amines are obtained in the range of 200° to 250° C. that is the temperature range generally employed.

The process is generally operated under a total pressure in excess of 200 atmospheres. The upper pressure at which the process can be operated is determined only by the structural limitations of the equipment used. Since optimum results from the standpoint of yield and reaction rate are realized when the process is operated under a total pressure of from 700 to 1500 atmospheres, this range embraces the preferred pressure conditions.

A solvent or diluent is not necessary but may be employed if desired. Suitable solvents are methanol, ethanol, water, methyl acetate, benzene, saturated hydrocarbons such as cyclohexane, naphtha and the like; ethers such as dioxane, diethyl ether, and the like. The amount of solvent used can vary up to 95% by weight of the total reaction mixture. A solvent may advantageously be employed in such instances where the reaction is highly exothermic. If a solvent is used, then solutions containing at least 5% of the aliphatic nitrile are employed, thus reducing recovery costs and losses of desired N-alkyl substituted aliphatic amine.

The catalysts used in the practice of this invention are the carbonyls of group VIII metals of atomic numbers 27 through 44 and the derivatives of these carbonyls, such as the hydrides, salts and adducts with diene hydrocarbons. These carbonyls may be preformed or they may be formed in situ in the reaction mixture from the free metal, its oxide, or from salts of the metals. These metal carbonyls or metal carbonyl derivatives may be made by:

1. Direction reaction of carbon monoxide and the metal in reactive form.
2. Reacting a salt of the metal with carbon monoxide. Thus, by reacting a complex cyanide of divalent cobalt with carbon monoxide or by reacting cobalt cyanide, suspended in sodium hydroxide, with carbon monoxide. In place of the cyanide there can be used cobalt mercaptide and inorganic and organic thio salts of cobalt such as cobalt thiosalicylate, xanthate, etc.
3. By reaction of a compound of the metal with carbon monoxide at high pressures.

A typical adduct of a carbonyl of a group VIII metal of atomic number 27 through 44 with a diene hydrocarbon is the adduct of butadiene with cobalt carbonyl. This material is prepared in accord with the disclosures in copending application of William W. Prichard, U. S. Serial No. 779,837, filed October 14, 1947, as follows:

A silver-lined pressure reactor of 400 cc. capacity was charged with 30.6 grams (0.0895 mole) of dicobalt octacarbonyl $Co_2(CO)_8$ and 100 grams (1.67 moles) of isopropanol. The reactor was pressured to 100 atmospheres with carbon monoxide, heated to 130° C., and then butadiene was continuously injected at such a rate that 10 grams (0.185 mole) of butadiene was introduced during 30 minutes. The reactor was maintained at 130° C. for an additional 30 minutes and then cooled. When discharged in a nitrogen atmosphere, 135 grams of dark colored liquid was recovered from the reactor. This liquid was distilled under nitrogen, the pressure being so adjusted that the distillation vessel temperature did not exceed 50° C. After removal of the solvent, the pressure was lowered to 2 mm. and 11.2 grams of orange-red liquid butadiene-cobalt carbonyl adduct distilled and was collected at 32 to 33° C. under this pressure. The product was stable at room temperature under a nitrogen blanket but when exposed to air it reacted rapidly with oxygen to give a black, tarry mass. Analysis of the butadiene-cobalt carbonyl adduct showed it to contain 25.58 and 25.88% cobalt (calculated for $C_8H_7O_4Co$: Co 26.11%).

A preparation of a cobalt carbonyl is the following (J. Am. Chem. Soc. 70, 383-6 (1948)):

Alloy skeleton cobalt (4 to 8 grams) was placed with 145 grams of diethyl ether under carbon monoxide at 3200 lbs./sq. in. pressure and heated with shaking for five to six hours at 150° C., after which the reaction vessel was allowed to cool. The pressure dropped during the period of heating from 4900 to 4300 lbs./sq. in. and then to 2200 lbs./sq. in., when the reactor was cooled to room temperature. The insoluble portion of the reaction mixture was removed by centrifugation. The clear, reddish liquid recovered measured 160 cc. and it contained 8.9 grams of dicobalt octacarbonyl.

The group VIII metals of atomic number 27 through 44 are cobalt, nickel, and ruthenium. Of these, the preferred catalysts are those in which cobalt carbonyl is present as an essential component because of the ease with which they are prepared and because of their high catalytic effectiveness.

The amount of metal carbonyl can be as little as 0.5% by weight of the aliphatic nitrile being reduced. Generally, however, it is preferred to employ at least 1% of the metal carbonyl by weight of the aliphatic nitrile because of the improved reaction rates obtained thereby. The use of amounts of metal carbonyl in excess of 20% by weight of the aliphatic nitrile leads to no advantages either in reaction rate improvement or in yield of desired N-alkyl substituted aliphatic amine.

The reductive alkylation of this invention is considered to be complete when there is no further observed pressure drop. This generally requires from five to twenty hours.

In the examples acetonitrile, butyronitrile, alpha-methylbutyronitrile, formonitrile and acrylonitrile have been used. In place of these, there can be used any monomeric aliphatic nitrile such as for example capronitrile, caprylonitrile, lauronitrile, stearonitrile, hexenonitrile, oleonitrile, succinonitrile, adiponitrile, sebaconitrile, 1,4-dicyanobutene-2, 1,4-dicyanobutene-1 and the like.

Monomeric aliphatic nitriles containing only carbon, hydrogen, and nitrile nitrogen are preferred.

In the case of formonitrile the reductive alkylation may be effected under alkaline conditions if desired, e. g., sodium or the alkali metal cyanides in aqueous or alcoholic solution may be used.

The reductive alkylation process of this invention makes it possible to prepare N-alkyl substituted amines in one step. By suitable variation in the conditions, the process can be adjusted to produce preponderant amounts of either the N-monoalkyl or N-dialkyl substituted aliphatic amines. These amines may be employed, for example, in formulation of detergents and as intermediates in the synthesis of rubber chemicals and pesticides.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of aliphatic amines which comprises heating a mixture of a monomeric aliphatic nitrile containing only carbon, hydrogen, and nitrile nitrogen, with a mixture of carbon monoxide and hydrogen in mole ratio from 1:10 to 3:1, at 100–275° C. and a pressure of at least 200 atmospheres, in contact with a catalyst essentially comprising a carbonyl of an eighth group element of atomic number 27 to 44.

2. A process for the preparation of aliphatic amines which comprises heating a mixture of a monomeric aliphatic nitrile containing only carbon, hydrogen, and nitrile nitrogen, with a mixture of carbon monoxide and hydrogen in mole ratio from 1:5 to 1:10, at 200–250° C. and a pressure of 700–1500 atmospheres, in contact with a catalyst essentially comprising a carbonyl of an eighth group element of atomic number 27 to 44.

3. Process of claim 2 wherein the nitrile is formonitrile.

4. A process for the preparation of aliphatic amines which comprises heating a mixture of a monomeric aliphatic nitrile containing only carbon, hydrogen, and nitrile nitrogen, with a mixture of carbon monoxide and hydrogen in mole ratio from 1:10 to 3:1, at 100–275° C. and a pressure of at least 200 atmospheres, in contact with a carbonyl of an eighth group element of atomic number 27 to 44.

5. A process for the preparation of aliphatic amines which comprises heating a mixture of a monomeric aliphatic nitrile containing only carbon, hydrogen, and nitrile nitrogen with a mixture of carbon monoxide and hydrogen in mole ratio from 1:10 to 3:1, at 100–275° C. and a pressure of at least 200 atmospheres, in contact with a catalyst consisting essentially of a carbonyl of an eighth group element of atomic number 27 to 44.

6. A process for the preparation of aliphatic amines which comprises heating a mixture of a monomeric aliphatic nitrile of the class consisting of HCN, lower fatty acid nitriles and acrylonitrile with a mixture of carbon monoxide and hydrogen in mole ratio of 1 to 2 at a minimum temperature of 200° C. and a pressure of at least 690 atmospheres in contact with a carbonyl of a metal of the class consisting of nickel, cobalt, and ruthenium.

7. Process of claim 2 wherein the nitrile is acetonitrile.

8. Process of claim 2 wherein the nitrile is $\alpha$-methylbutyronitrile.

9. Process of claim 2 wherein the nitrile is acrylonitrile.

10. Process of claim 2 wherein the nitrile is a lower fatty acid nitrile.

GLENN F. HAGER.

No references cited.